Patented Nov. 6, 1951

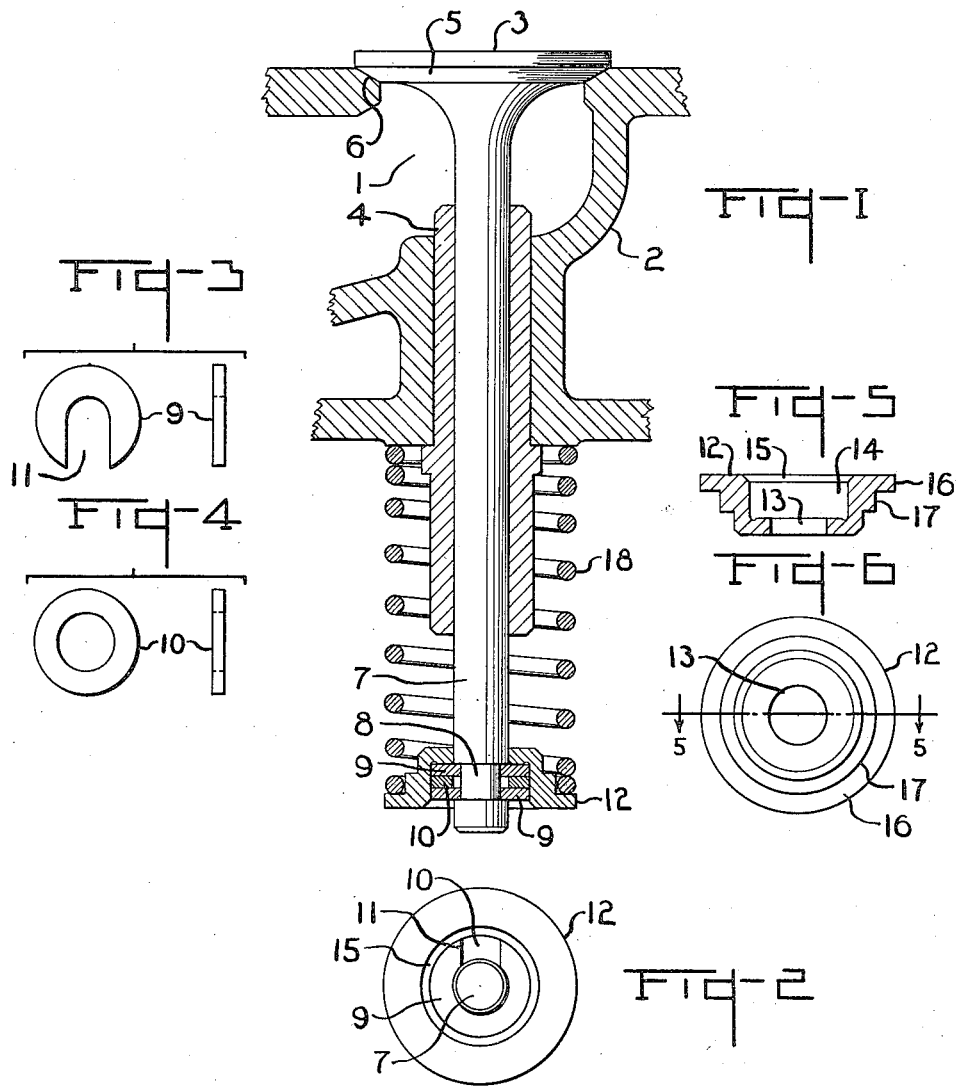

2,574,120

UNITED STATES PATENT OFFICE 2,574,120

POPPET VALVE ASSEMBLY

George R. Rich, Battle Creek, Mich., assignor to Rich Manufacturing Corporation, Battle Creek, Mich., a corporation of Michigan Application June 17, 1946, Serial No. 677,318

2 Claims. (Cl. 123—90)

The present invention relates broadly to the mounting of valves, and in its specific phases to a poppet valve assembly for internal combustion engines.

According to practice which is commonly used in connection with poppet valves of internal combustion engines, such as automobile engines, the spring retainer cup at the end of the valve stem is gripped solid on the stem by removable semi-circular inserts which engage a groove or grooves in the stem, and have a tapered exterior which fits a tapered socket in the spring retainer cup so as to produce a wedging action. With this type of construction the friction of the ends of the compressed valve spring on the motor block and on the solidly gripped spring retainer cup effectively locks the valve against rotation. This causes so called "grunt grabbing," promotes uneven wear of the valve seat and block seat, tends to produce hot spots and the spot building up of carbon and lead deposits on the seating area, and stem breakage directly under the valve head due to fatigue caused by spring wind pressure.

The solid grip parts of the valve assembly described above are seldom perfectly produced, and as a result the plane of the solidly gripped spring retainer cup is commonly out of true perpendicular to the axis of the valve stem. This, in combination with spring wind pressure and the solid grip of the spring retainer cup on the stem, eccentrically loads the valve stem so that it wears on one side at one end of the valve guide and on the other side at the opposite end of the valve guide. The friction on the valve stem caused by this eccentric loading also requires that the valve spring be heavier than otherwise necessary, and after considerable wear has occurred is commonly the cause of the valves not seating properly, as well as being out of alignment. It was a recognition of these problems and difficulties which led to the conception and development of the present invention.

Accordingly among the objects of the present invention is the provision of a new valve assembly which causes automatic progressive rotating or indexing of the valve in use, and in doing so (1) reduces one spot collection of carbon and lead deposits in the valve seating area, (2) keeps the valve seat and block seat round and even wearing, (3) materially reduces groove wear on the seat of the valve, (4) stops stem breakage directly under the valve head which is due to fatigue caused by spring wind pressure, (5) reduces valve burning, and (6) substantially eliminates spot wear of the valve stem at the top and bottom of the valve guide.

Another object is to produce a valve assembly wherein the valve is free seating.

Another object is to produce a low cost and long life valve assembly due to the simplicity and positiveness of its action.

Another object is to produce a valve assembly which, due to its construction and freeness of action, does not require as heavy a spring as is now commonly used on like size valve assemblies, and thus increases the engine's power.

A further object is to provide a valve assembly which is self aligning and self centering and which holds its seating and alignment better than usual even after considerable wear.

A further object is to produce a valve assembly which is so constructed and accurately made as to be easy to assemble or remove, and which facilitates rotation of the valve.

Still further objects and advantages of the invention will become apparent as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In the annexed drawing:

Figure 1 shows a sectional assembly view of a preferred form of the present improved valve assembly.

Figure 2 shows a bottom view of the assembly shown in Figure 1.

Figure 3 shows a face and edge view of a U-shaped washer forming part of the improved assembly.

Figure 4 shows a face and edge view of a slip washer forming part of the improved assembly.

Figure 5 shows a center sectional view of the spring retainer cup as taken at line 5—5 of Figure 6.

Figure 6 shows the full spring retainer cup as viewed from the bottom of Figure 5.

Referring more particularly to Figure 1 of the drawing, valve port 1 of motor block 2 is shown with the head of valve 3 closing same. This valve is adapted to be reciprocated endwise through valve guide 4 in conventional free manner with the valve seat 5 engaging with block seat 6 when the valve is in closed position as shown.

Valve stem 7, adjacent the lower end of same, is provided with an accurately machined circumferential recess or groove 8 in which are assembled a pair of substantially U-shaped washers 9 with a plain slip washer 10 between them, said U-shaped washers being rotatable relative to said slip washer in said groove. The opening 11 of U-shaped washer 9 is of a size and location such that it will closely but freely fit the inside diameter of groove 8 and permit the free centering of the washer on the valve stem under conditions of use. Plain slip washer 10 is preferably made with approximately the same outside diameter as U-shaped washer 9, while the inside diameter of the plain washer is slightly larger than the diameter of valve stem 7 to facilitate assembly. The U-shaped washers and the plain slip washer are all made from high grade steel, properly machined, hardened, and ground to close tolerances to facilitate freedom of rotation under conditions of use and to completely eliminate solid gripping of the spring retainer cup 12 on valve stem 7. While for convenience three washers have been shown in the assembly drawing, the invention is not limited to that number since obviously more washers may be used without departing from the spirit of the invention.

The spring retainer cup 12 has a center bore 13 slightly larger than valve stem 7 so as to form a free fit therewith when mounted as shown in Figure 1. Concentric with bore 13 is a counterbore 14 which closely fits but is slightly larger than the outside diameter of washers 9 and 10, which are rotatable therein, and is preferably slightly longer than their combined thickness. The outer end of the counterbore may be provided with a chamfer 15 to facilitate assembly of the valve spring cup and washers on the valve stem. On the outer face of the cup is a flange 16 and an axially extending shoulder 17, the latter being of a diameter slightly smaller than the inside diameter of valve spring 18 in order to center same on the valve, while flange 16 supports the end of the valve spring when assembled as shown in Figure 1. This spring retainer cup is accurately bored and machined so as to be concentric throughout and to have a bottom and flange which are square with its axis. In order to assure long wear, the cups may be made from high quality steel, and heat treated.

Valve assemblies in automobile engines are automatically supplied with oil so that the valve stem will not stick in the valve guide. The oil thus supplied will keep the ground substantially U-shaped washers and plain slip washer oiled so that they will freely slip on each other and not only relieve spring wind stresses but promote unidirectional rotation of the valve under conditions of use.

With valve 3 assembled in place as shown in Figure 1, and spring retainer cup 12 freely mounted on the valve stem so that it can rotate thereon and relieve the spring wind stresses, as described, the valve is found to rotate during operation. It is believed that the cause of this rotation is that there is relief for the spring wind tension each time the valve reciprocates, and this alternate relieving and reciprocating of the valve during operation gradually rotates same in one direction so as to make the wear on the valve seat more uniform and to promote the other benefits set forth above.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a continuously loaded valve assembly of the character described, the combination which comprises a valve with a head having a smooth tapered seat and a stem, said stem having a longitudinally extending radial groove adjacent the end thereof remote from the head, said groove constituting the only connection to said valve, a spring retainer cup closely but freely fitting said stem, said spring retainer cup having a counterbore substantially larger than said valve stem and adapted to extend over said longitudinally extending radial groove in the valve stem, a slip washer rotatably fitting said counterbore and having an opening therethrough larger than the diameter of said valve stem for free rotation relative to same, a pair of U-shaped washers rotatably fitting said counterbore and having a side opening smaller than the diameter of the valve stem but freely fitting the groove in said stem for rotation therein, said U-shaped washers being mounted on opposite sides of said slip washer and the three of them having a total thickness slightly less than the length of said groove, whereby when said spring retainer cup is assembled on said valve stem by means of said washers they will facilitate uncontrolled substantially free unidirectional rotation of said valve relative to said cup, and a valve spring engaging said spring retainer cup for continuously loading said valve.

2. A continuously loaded valve assembly for a block having an inlet port with a smooth tapered frusto-conical seat, a plain valve guide below said port and concentric with the seat thereof, and a valve spring, which consists of a valve with head and stem, said valve head having a seat adapted to seal on the block seat at the inlet port, said valve stem freely passing through said valve guide and having a longitudinally extending radial groove adjacent the end thereof remote from the head, said groove constituting the only connection to said valve, a spring retainer cup having a bore slightly larger than the diameter of said valve stem and a still larger counterbore adapted to extend over said groove in the valve stem, said spring retainer cup having a shouldered outturned flange adapted to receive one end of said valve spring and center same on said valve stem while the other end of said spring bears against said block and continuously exerts closing force on said valve, said spring retainer cup opening away from the valve head, a slip washer closely but rotatably fitting said counterbore and having a central opening therethrough larger than the diameter of said valve stem for free rotation relative to same, and a pair of U-shaped washers rotatably fitting said counterbore and having a side opening smaller than the diameter of the valve stem but freely fitting the groove in said stem for rotation therein, said U-shaped washers being mounted on opposite sides of said slip washer and the three of them having a total thickness slightly less than the length of said groove, whereby when said spring retainer cup is assembled on said valve stem in outwardly opening position by means of said washers, they will facilitate uncontrolled substantially free unidirectional rotation of said valve relative to said cup.

GEORGE R. RICH.

REFERENCES CITED

The following references are of record in the file of this patent:

UNITED STATES PATENTS

| Number | Name | Date |
|---|---|---|
| 972,434 | Blomberg | Oct. 11, 1910 |
| 1,160,028 | Wright | Nov. 9, 1915 |
| 1,183,852 | Buck | May 23, 1916 |
| 1,213,590 | Compton | Jan. 23, 1917 |
| 1,479,169 | Buck | Jan. 1, 1924 |
| 2,142,224 | Turlay | Jan. 3, 1939 |
| 2,165,238 | Douglas et al. | July 11, 1939 |
| 2,165,239 | Douglas et al. | July 11, 1939 |
| 2,346,525 | Voorhies | Apr. 11, 1944 |